(12) United States Patent
Cappelli et al.

(10) Patent No.: US 9,645,571 B2
(45) Date of Patent: May 9, 2017

(54) RELIABILITY MAINTAINING SERIAL NUMBER CREDIT PROCESS

(71) Applicant: Sikorsky Aircraft Corporation, Stratford, CT (US)

(72) Inventors: Marcus D. Cappelli, Shelton, CT (US); Jack Z. Zhao, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 859 days.

(21) Appl. No.: 13/826,701

(22) Filed: Mar. 14, 2013

(65) Prior Publication Data

US 2014/0278149 A1 Sep. 18, 2014

(51) Int. Cl.
  *G05B 19/4065* (2006.01)
  *G06Q 10/06* (2012.01)
  *G07C 3/00* (2006.01)

(52) U.S. Cl.
  CPC ... *G05B 19/4065* (2013.01); *G06Q 10/06395* (2013.01); *G07C 3/00* (2013.01)

(58) Field of Classification Search
  CPC . G05B 19/4065; G05B 23/0283; G06F 19/00; G06Q 10/06395; G07C 3/00
  USPC .............................................. 702/34; 700/29
  See application file for complete search history.

(56) References Cited

U.S. PATENT DOCUMENTS

| | | | |
|---|---|---|---|
| 4,707,796 A | 11/1987 | Calabro et al. | |
| 5,816,530 A | 10/1998 | Grube | |
| 6,226,597 B1 * | 5/2001 | Eastman | G06Q 10/06 702/34 |
| 7,149,657 B2 | 12/2006 | Goebel et al. | |
| 8,200,442 B2 | 6/2012 | Adams et al. | |
| 2004/0133395 A1 * | 7/2004 | Ding | G06F 11/3452 702/182 |
| 2010/0023209 A1 | 1/2010 | Maisonneuve et al. | |
| 2010/0235109 A1 * | 9/2010 | Zhao | G06Q 10/04 702/34 |
| 2011/0264310 A1 | 10/2011 | Bates et al. | |

OTHER PUBLICATIONS

Extended European Search Report, European Search Report or partial European Search Report/declaration of no search and the European Search Opinion for International Application No. 14151095.8-1958, Mar. 25, 2014, 4 [ages/.

* cited by examiner

*Primary Examiner* — Gregory J Toatley
*Assistant Examiner* — Kyle R Quigley
(74) *Attorney, Agent, or Firm* — Cantor Colburn LLP

(57) ABSTRACT

Embodiments are directed to receiving, by a computing device comprising a processor, an anticipated usage input, a load input and a strength input associated with a unit, calculating, by the computing device, a baseline reliability value based at least in part on the anticipated usage input, the load input and the strength input, receiving, by the computing device, usage data associated with use of the unit, generating, by the computing device, an updated reliability value based on at least some of the inputs used to calculate the baseline reliability value and the usage data, and determining, by the computing device, a lifetime for the unit based on the updated reliability value.

23 Claims, 5 Drawing Sheets

RELIABILITY MAINTAINING SERIAL NUMBER CREDIT PROCESS

STATEMENT REGARDING FEDERALLY SPONSORED RESEARCH OR DEVELOPMENT

This invention was made with Government support under DTFACT-11-D-00004 awarded by DOT/FAA William J. Hughes Technical Center. The Government has certain rights in this invention.

BACKGROUND

Certain rotorcraft component fatigue lifetimes are currently established by a deterministic damage calculation which may be used to provide approximately "6-9's" of reliability. The inputs to the calculation may be derived from past experience and engineering assumptions that may be used to incorporate design conservatism. Current health and usage monitoring systems (HUMS) methodologies provide measurements of loads and usage which can be used to remove excessive conservatisms from damage calculations, or provide additional safety to operators desiring additional margin. Methodologies are required to integrate these measurements into a process used to monitor operational lifetime while simultaneously and rigorously ensuring a desired level of reliability.

BRIEF SUMMARY

An embodiment of the disclosure is directed to a method comprising: receiving, by a computing device comprising a processor, an anticipated usage input, a load input and a strength input associated with a unit, calculating, by the computing device, a baseline reliability value based at least in part on the anticipated usage input, the load input and the strength input, receiving, by the computing device, usage data associated with use of the unit, generating, by the computing device, an updated reliability value based on at least some of the inputs used to calculate the baseline reliability value and the usage data, and determining, by the computing device, a lifetime for the unit based on the updated reliability value.

An embodiment of the disclosure is directed to an apparatus comprising: at least one processor, and memory having instructions stored thereon that, when executed by the at least one processor, cause the apparatus to: receive an anticipated usage input, a load input and a strength input associated with an aircraft, calculate a baseline reliability value based at least in part on the anticipated usage input, the load input and the strength input, receive usage data associated with use of the aircraft, generate an updated reliability value based on at least some of the inputs used to calculate the baseline reliability value and the usage data, and determine a lifetime for the aircraft based on the updated reliability value.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
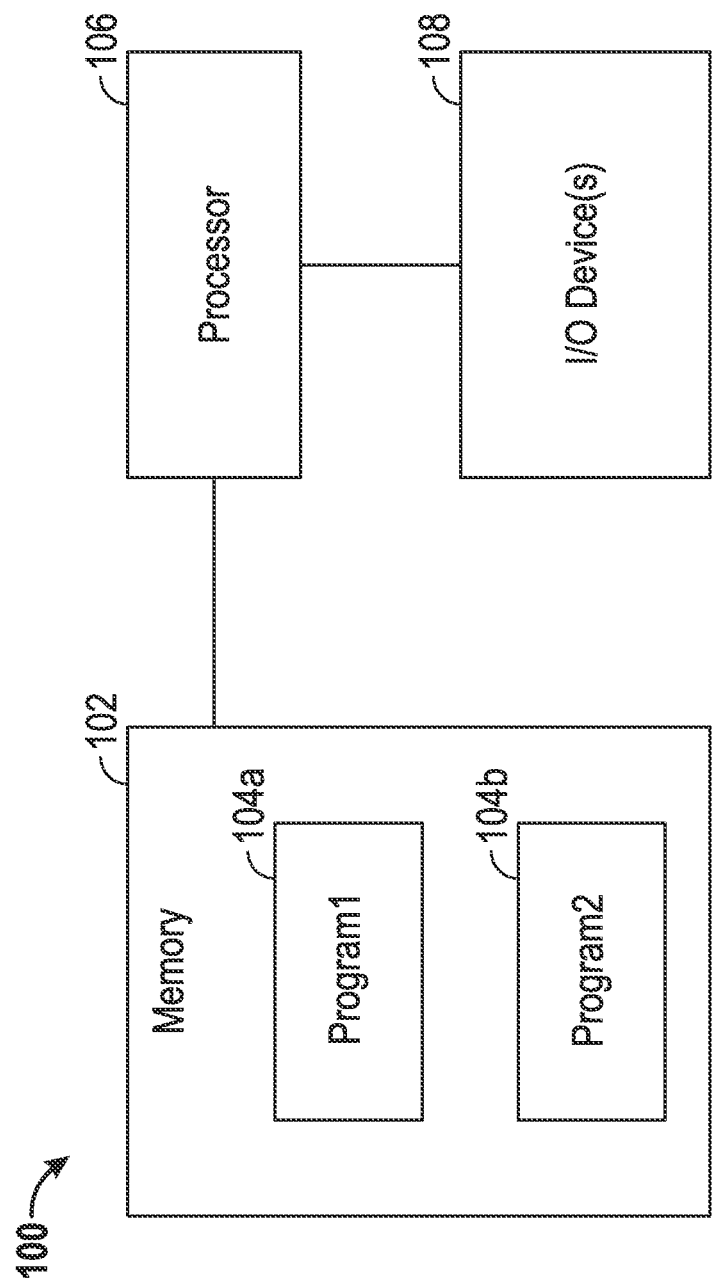
FIG. 1 is a schematic block diagram illustrating an exemplary computing system in accordance with one or more embodiments of this disclosure.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for determining a lifetime (e.g., a reliable operational lifetime) associated with one or more components, devices, pieces of equipment, etc. In some embodiments, a lifetime may be extended (e.g., a credit may be awarded) relative to a baseline version or computation of the lifetime. In some embodiments, a lifetime for a unit may be determined based on data that is available for the unit, potentially as opposed to using data for an entire production run associated with a plurality of units.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more processes, routines, methods, etc. As an example, at least a portion of the instructions are shown in FIG. 1 as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, etc. The I/O device(s) 108 may be configured to provide an interface to allow a user to interact with the system 100.

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1. One or more of the entities shown in FIG. 1 may be associated with one or more of the devices or entities described herein.

Figure 2:
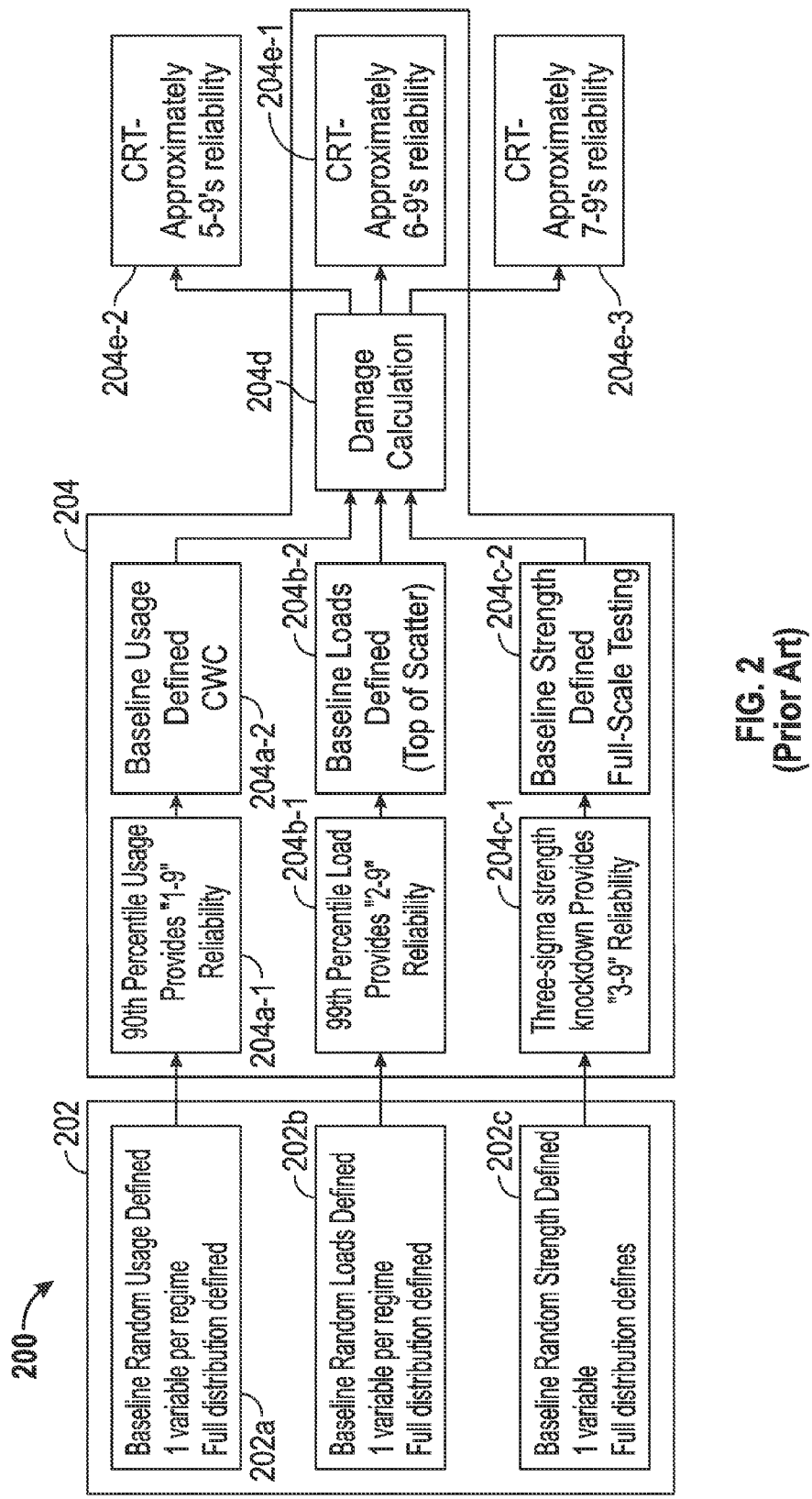
FIG. 2 illustrates a flow chart of a damage calculation in accordance with the prior art.

Turning to FIG. 2, a flow chart 200 of a damage and lifetime calculation in accordance with the prior art is shown. As shown in FIG. 2, a number of inputs 202 may be associated with the calculation. The inputs may include a usage input 202a, a load input 202b, and a strength input 202c. The usage input 202a may be defined in terms of excepted or anticipated frequency or time of use (e.g., hours of operation) and/or operations undertaken. For example, in the context of a calculation associated with an aircraft, the usage input 202a may be at least partially defined in terms of aircraft maneuvers, such as take-off, climb, turn, land, etc. The load input 202b may be at least partially defined in terms of expected or anticipated weight of the unit or payload carried by the unit, maneuver loads (acceleration or deceleration), environmental conditions (e.g., wind, temperature, pressure), etc. The strength input 202c may correspond to expected or anticipated strength of the unit being analyzed and may be at least partially based on fatigue testing.

One or more variables (e.g., random variables) may be defined for each of the inputs 202a, 202b, and 202c. In some embodiments, composite worst case (CWC) line items for insignificant, marginal, or minimal inputs (e.g., input loads 202b) may be grouped into one variable. The variable(s) may be defined in accordance with various distribution types (e.g., a Weibull distribution, Normal distribution, or Lognormal distribution), and parameters may be chosen based on a selected distribution type or past experience.

The inputs 202 may be used to drive a calculation process 204. For example, as shown in FIG. 2, the usage input 202a may drive a "1-9's" reliability 204a-1, which in turn may drive a baseline usage definition CWC 204a-2. The load input 202b may drive a "2-9's" reliability 204b-1, which in turn may drive a baseline load definition 204b-2. The strength input 204c may drive a "3-9's" reliability 204c-1, which in turn may drive a baseline strength definition 204c-2. The baseline usage definition CWC 204a-2, the baseline load definition 204b-2, and the baseline strength definition 204c-2 may serve as inputs to, or drive, a damage or lifetime calculation 204d. The calculation 204d may generate one or more outputs indicative of different levels of reliability based on inputs from 204a-1, 204b-1, 204c-1 for various reliability allocation schemes. A first output level 204e-1 may be indicative of the so-called "6-9's" reliability. A second output level 204e-2 may be indicative of the so-called "5-9's" reliability. A third output level 204e-3 may be indicative of the so-called "7-9's" reliability. Which of the levels 204e-1 through 204e-3 is selected as an output to use in a particular embodiment may be a function of one or more inputs or conditions, such as environmental considerations, consequences of inoperability, costs for repairs or maintenance, etc.

The calculation 204 (e.g., the generation of output levels 204e-1, 204e-2, and/or 204e-3) is typically based on engineering assumptions and past experience. The calculation 204 tends to err on the side of being conservative, such that a unit (e.g., an aircraft or component or device thereof) that is the subject of the calculation 204 tends to be assigned an operational lifetime that is less than is warranted. Moreover, the calculation 204 fails to take into consideration data that may be obtained based on actual field use of the unit.

Figure 3:
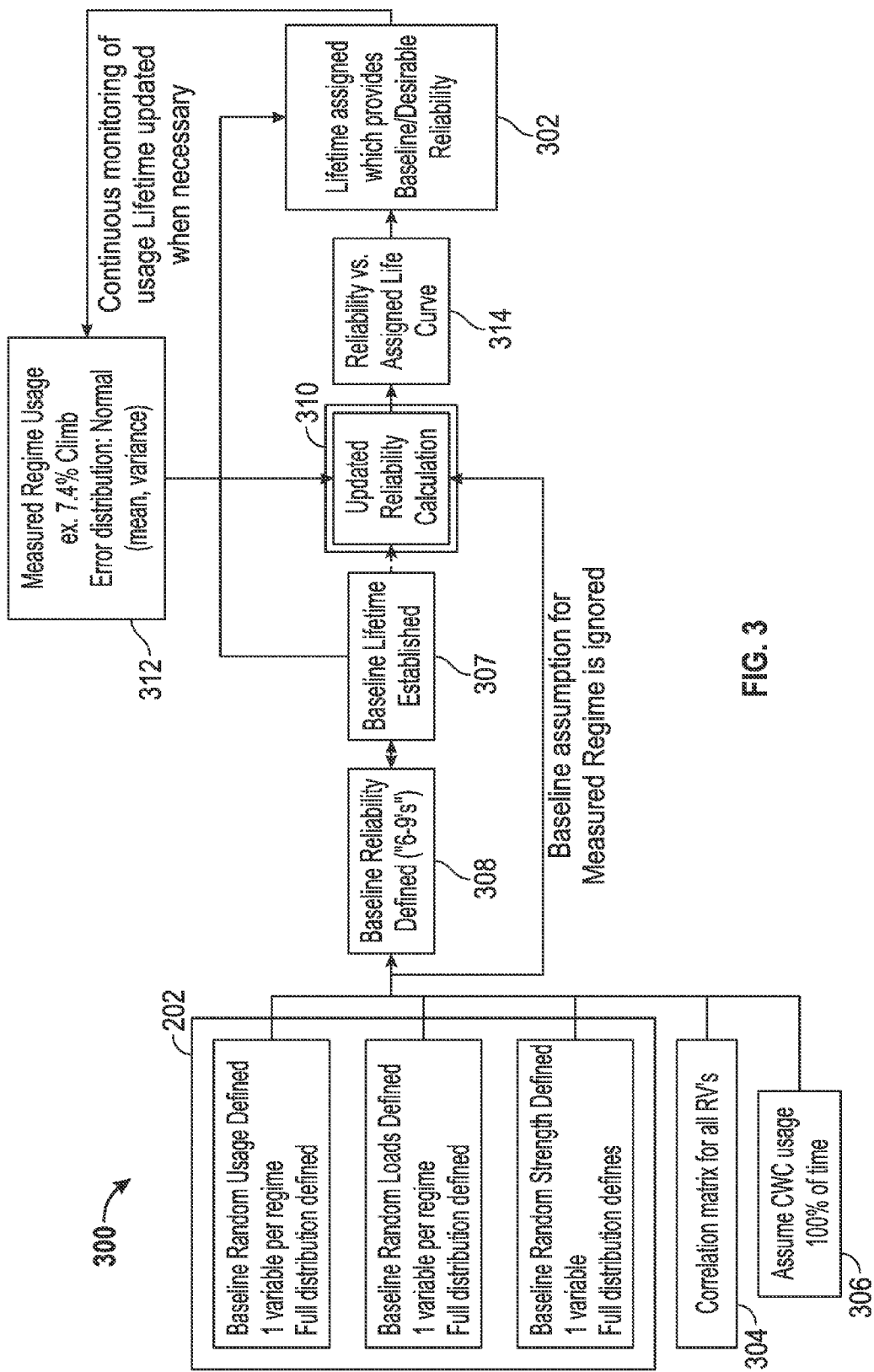
FIG. 3 is a flow chart of an exemplary usage monitoring process in accordance with one or more embodiments of this disclosure.

Turning to FIG. 3, a flow chart of a usage monitoring process 300 in accordance with one or more embodiments is shown. The usage monitoring process 300 may be used to compute or assign a lifetime 302 to a unit that is the subject of the process 300, as described further below. The usage monitoring process 300 may be implemented using a system such as that shown in FIG. 1.

The process 300 may be associated with a number of inputs. For example, the inputs 202 of FIG. 2 may serve as inputs to the process 300. A correlation matrix 304 may be defined for some or all of the variables associated with the inputs 202. The correlation matrix 304 may be defined where dependencies between variables physically exist. The correlation matrix 304 may serve as an input to the process 300. An assumption of CWC usage 306 may serve as an input to the process 300. In some embodiments, the assumption of CWC usage 306 may correspond to continuous usage (e.g., 100% usage) of the unit that is the subject of the process 300, or some other value or level of usage. A baseline or desirable reliability level 307 may be defined as input to the process 300.

The inputs 202, 304, 306, and 307 may drive, or be applied to, a calculation process 308. The calculation process 308 may correspond to the calculation process 204 of FIG. 2. While the calculation process 308 is shown as defining a baseline reliability level of "6-9's" (e.g., level 204e-1 of FIG. 2) in FIG. 3, another level (e.g., 204e-2, 204e-3, or any other level) may be provided by the process 308.

The process 300 may provide for an updated or modified reliability calculation 310. The updated reliability calculation 310 may be based on the baseline reliability level calculation process 308 inputs (202, 304) and measured regime usage data 312. Assuming that the process 300 is being applied to determine a lifetime 302 associated with an aircraft, one or more regimes may be associated with usage of the aircraft. For example, regimes may be associated with maneuvers performed by the aircraft, such as take-off, climb, turn, land, etc. The example depicted in FIG. 3 assumes a climb regime is being analyzed, and further assumes that the usage data 312 obtained in the field for the aircraft indicates that the aircraft experiences or undergoes a climb maneuver 7.4% of the time. The usage data 312 may also have a distribution associated with it, as described further below.

The distribution associated with the usage data 312 may represent or reflect a degree of uncertainty in the usage data 312. The uncertainty in the usage data 312 may be classified in accordance with a number of types or categories. A first category may be based on the uncertainty being dependent on time spent in a regime. A second category may be based on the uncertainty being independent of time spent in a regime. A third category may be based on the uncertainty being dependent on a combination of time spent in a regime and percentage (e.g., measurement percentage) based uncertainties. In addition, measurement error associated with usage data, in terms of instrument limit or human error can also be addressed in connection with the usage data 312.

Outputs (e.g., measured data) associated with a regime recognition process may be compared to so-called "truth data" that may be based on one or more inputs, such as one or more user inputs (e.g., pilot input). Based on the comparison of the outputs associated with the regime recognition process and the "truth data," an entity (e.g., a computing device) or a user (e.g., an engineer) may determine a category of uncertainty for the usage data 312.

In some embodiments, a single instance distribution may be generated. For example, statistical distributions may be fit to the uncertainty in the usage data 312, where the form of the distributions may depend on the category of uncertainty in the usage data 312. The distribution may be of the uncertainty (percentage based or time based) for, e.g., a single instance of a regime.

In some embodiments, data for a fielded aircraft may be collected. For example, the number of occurrences of a regime in question for an aircraft seeking a usage credit may be determined from the field or usage data 312.

In some embodiments, a final distribution in the usage data 312 may be created or generated. The distribution may represent a random summation of N instances of a given regime. The N instances may be based on a collection and analysis of data, potentially as a function of time.

As shown in FIG. 3, in some embodiments the updated reliability calculation 310 may ignore any baseline assumptions made for the particular regime(s) that has/have been measured (e.g., climb in this example). The updated reliability calculation 310 may be based on, or apply, monte carlo techniques. The updated reliability calculation 310 may be based on, or apply, other structural reliability methods. Such other reliability methods may include one or more advanced reliability methods described in U.S. Pat. No. 8,200,442, entitled "Usage Monitor Reliability Factor Using An Advanced Fatigue Reliability Assessment Model", issued on Jun. 12, 2012, the contents of which are incorporated herein by reference.

From the updated reliability calculation 310, flow may proceed to a reliability versus (vs.) assigned life process or curve 314. The reliability vs. assigned life process 314 may map a reliability level or value to one or more assigned lifetimes. Thus, based on the reliability calculation 310, a lifetime may be assigned 302 using the process or curve 314. An example of a graph 400 that may be used in connection with block 314 is described below in connection with FIG. 4.

In some embodiments, a continuous or repeated monitoring of the (regime of) usage may be performed, as reflected via the flow from the assignment of the lifetime 302 to the measurement of usage 312. In some embodiments, the monitoring may occur for a specified time period (e.g., every 'x' days or every 'y' hours) or over one or more predetermined time intervals. In some embodiments, a determination of when to perform the monitoring may be based on a statistical analysis. The monitoring may be performed to update or modify the assigned lifetime 302, in reference to an identified reliability level. In some embodiments, the reliability level may be adjusted or shifted in response to one or more events or conditions.

Figure 4:
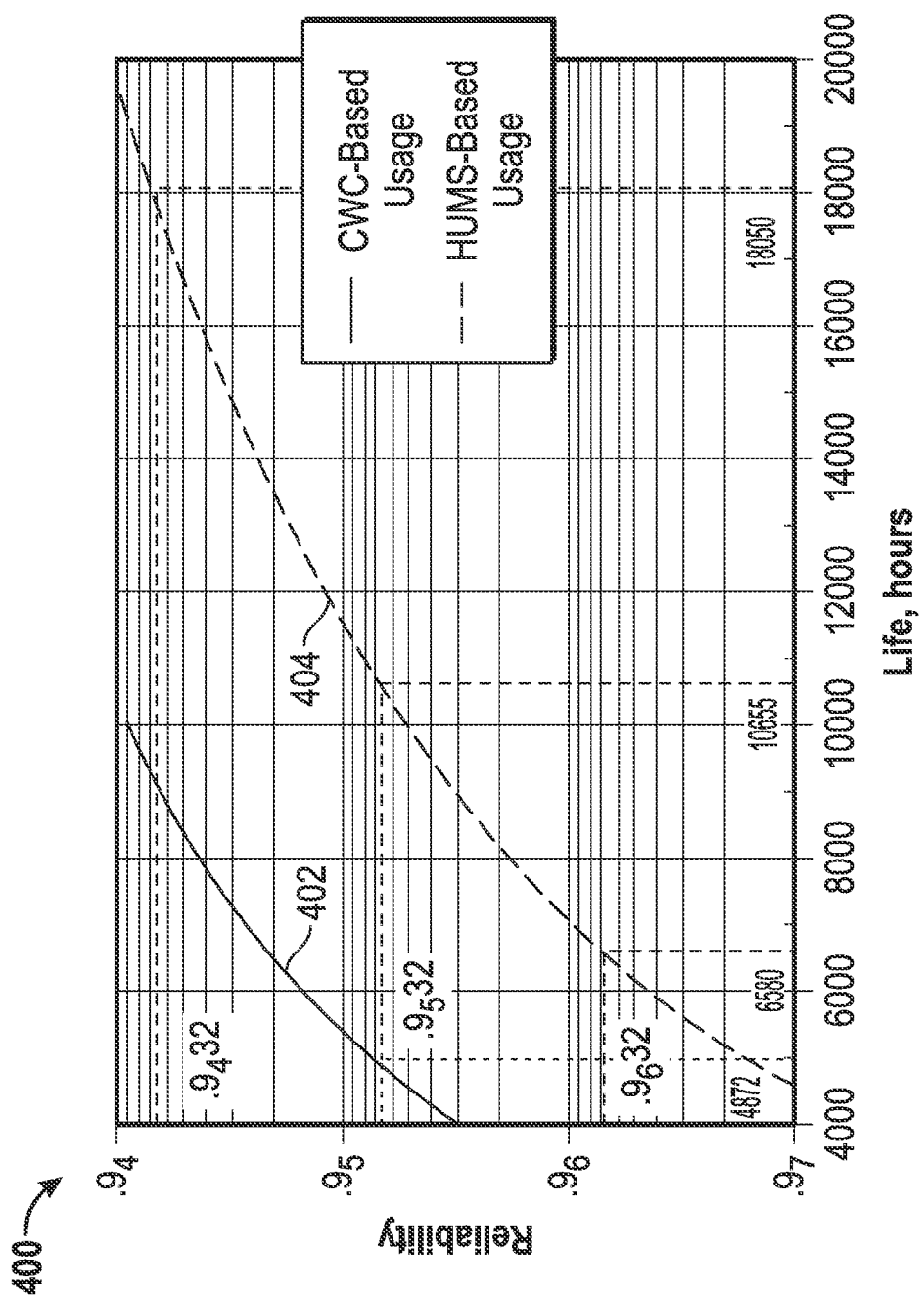
FIG. 4 is an exemplary graph of reliability and lifetime in accordance with one or more embodiments of this disclosure.

Turning now to FIG. 4, an exemplary reliability vs. assigned lifetime graph 400 is shown. As described above, the graph 400 may be used in connection with block 314 of FIG. 3 to map a reliability value to one or more lifetime values associated with various usage monitoring scenarios. The values shown in connection with the graph 400 are illustrative. Different values may be used in some embodiments.

The graph 400 includes two exemplary curves. A first curve, CWC-based usage 402, may correspond to a baseline curve that might not incorporate any field usage data. The curve 402 may be generated based on an application of the flowchart or process 200 of FIG. 2. A second curve, HUMS-based usage 404, may correspond to a modification of the curve 402 when taking into consideration actual data (e.g., usage data) available for a particular unit. The curve 404 may be generated based on an application of the flowchart or process 300 of FIG. 3.

A review of the graph 400 indicates that for a given reliability value, the assigned lifetime will be increased using the curve 404 relative to the curve 402. For example, using a reliability value of 0.9999932, the assigned lifetime using the curve 402 may be equal to 4872 hours, whereas the assigned lifetime using the curve 404 may be equal to 10655 hours. In other words, the lifetime will be enhanced or increased using the curve 404 relative to the curve 402, while maintaining the same reliability. More generally, an availability of usage data 312 may be exploited to extend or adjust the lifetime of a subject unit.

Figure 5:
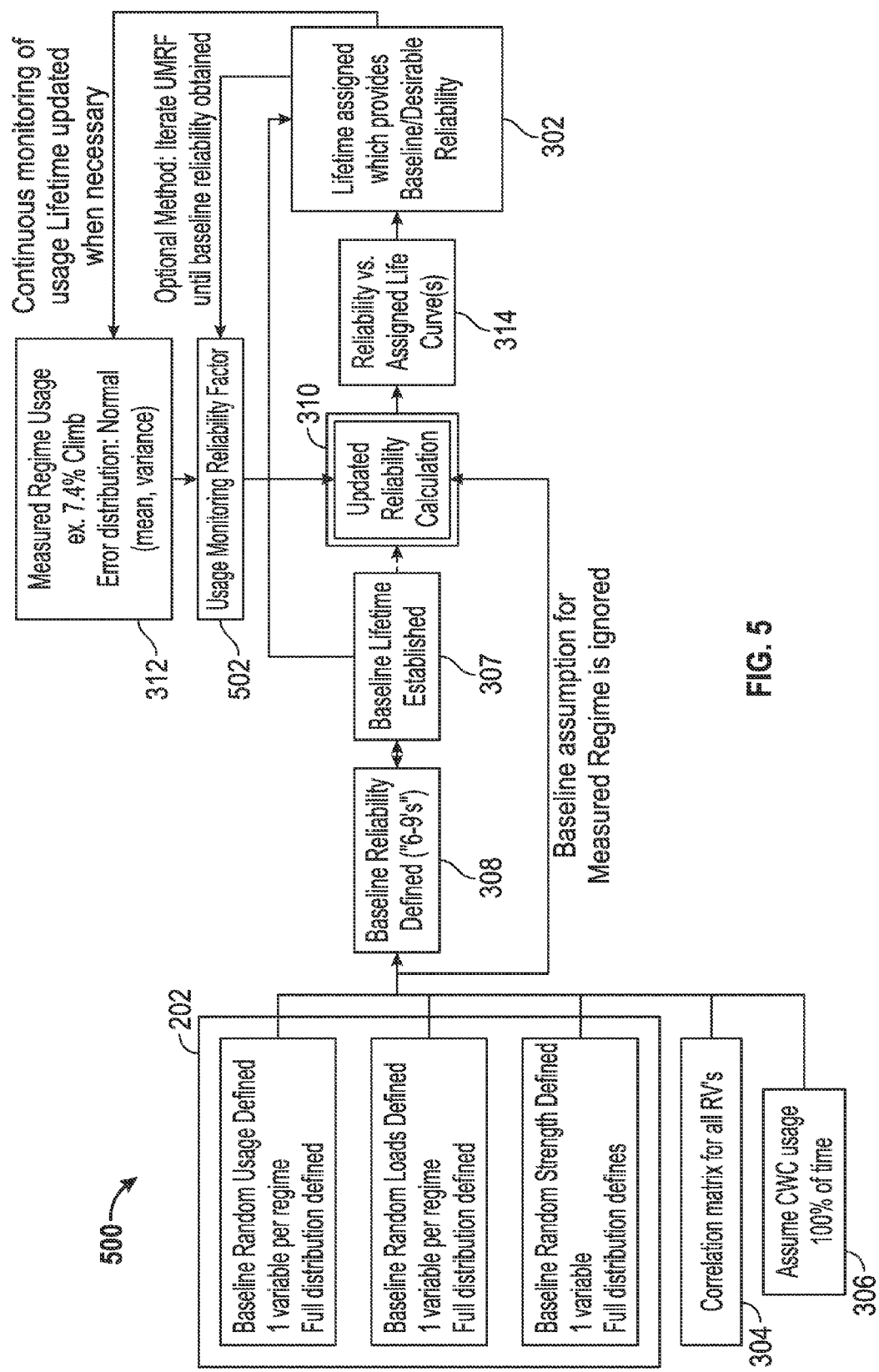
FIG. 5 is a flow chart of an exemplary usage monitoring process in accordance with one or more embodiments of this disclosure.

FIG. 5 is a flow chart of an exemplary usage monitoring process 500 in accordance with one or more embodiments. The usage monitoring process 500 may be implemented using a system such as that shown in FIG. 1. The process 500 may include many of the blocks described above in connection with the process 300 of FIG. 3, and so a complete re-description of those blocks is omitted for the sake of brevity. The process 500 includes a usage monitoring and reliability factor (UMRF) 502. The UMRF 502 may be used to weight the usage data 312. For example, if the usage data 312 indicates that an aircraft engages in a climb operation 7.4% of the time, the UMRF 502 may adjust the value to, e.g., 15% of the time, for use in the updated reliability calculation 310. Such an increase may be used to generate a more conservative assigned lifetime 302.

As shown in FIG. 5 via the flow from block 302 to block 502, in some embodiments an iteration of the UMRF 502 may occur until a baseline reliability is obtained. Once the baseline reliability is obtained, the particular value of the UMRF 502 for that particular iteration may be used going forward or in future applications of the process 500. The iteration may be performed in connection with a mapping or graph, such as the graph 400 of FIG. 4.

In some embodiments, in addition to, or as an alternative to, computing a lifetime for a unit, a probability of failure for the unit may be computed. Such a probability of failure computation may be based on a modification of one or more of the processes described herein.

Embodiments of this disclosure may be tied to one or more particular machines. For example, one or more computers, devices, or architectures may be configured to compute or adjust a lifetime based on a baseline calculation and data that may be obtained for a particular unit (e.g., a unit with a particular identification number or serial number) when the unit is implemented or used in the field. In some embodiments, a monitoring may take place to adjust the lifetime over time.

Some of the illustrative embodiments and examples described herein relate to lifetimes associated with an aircraft and components and devices thereof. Aspects of this disclosure may be applied in connection with other environments or contexts, such as marine applications, automotive applications, manufacturing activities, maintenance activities, etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
   receiving, by a computing device comprising a processor, an anticipated usage input, a load input and a strength input associated with one of an aircraft and an aircraft component;
   calculating, by the computing device, a baseline reliability value based at least in part on the anticipated usage input, the load input and the strength input of the one of an aircraft and an aircraft component;
   receiving, by the computing device, usage data associated with use of the one of an aircraft and an aircraft component;
   generating, by the computing device, an updated reliability value based on at least some of the inputs used to calculate the baseline reliability value and the usage data;
   comparing measured data for a regime of use with data based on at least one user input;
   determining a category of uncertainty in the usage data based on the comparison;
   fitting a distribution to the usage data based on the category;
   determining, by the computing device, a lifetime for the one of an aircraft and an aircraft component based on the updated reliability value; and
   updating a usage monitor and reliability factor (UMRF) of the one of the aircraft and the aircraft component based on the determined lifetime; and
   retiring the one of the aircraft and the aircraft component after the UMRF indicates a retirement time.

2. The method of claim 1, wherein generating the updated reliability value comprises at least one of:
   applying a monte carlo technique to the baseline reliability value inputs and the usage data; and
   applying an advanced reliability method to the baseline reliability value inputs and the usage data.

3. The method of claim 1, further comprising:
   monitoring, by the computing device, the usage data over time to capture variation in the usage data; and
   adjusting, by the computing device, the lifetime to account for the variation in the usage data.

4. The method of claim 3, wherein the monitoring occurs at one or more predetermined time intervals.

5. The method of claim 1, wherein the usage data pertains to at least one regime of use, and wherein the updated reliability value is generated by re-evaluating a portion of a usage input associated with the baseline reliability value that pertains to the at least one regime of use.

6. The method of claim 1, further comprising:
   subjecting, by the computing device, the usage data to the UMRF when generating the updated reliability value.

7. The method of claim 6, further comprising:
   iterating, by the computing device, use of the UMRF until the updated reliability value equals the baseline reliability value or an identified reliability value.

8. The method according to claim 1, further comprising:
   transmitting the updated reliability value from a health and usage monitor system (HUMS) module provided at the aircraft to a fleet management operations center (FMOC) to determine the lifetime and update the UMRF.

9. An apparatus comprising:
   at least one processor; and
   memory having instructions stored thereon that, when executed by the at least one processor, cause the apparatus to:
   receive an anticipated usage input, a load input and a strength input associated with an aircraft,
   calculate a baseline reliability value based at least in part on the anticipated usage input, the load input and the strength input,
   receive usage data associated with use of the aircraft,
   generate an updated reliability value based on at least some of the inputs used to calculate the baseline reliability value and the usage data;
   compare measured data for a regime of use with data based on at least one user input;
   determine a category of uncertainty in the usage data based on the comparison;
   fit a distribution to the usage data based on the category;
   determine a lifetime for the aircraft based on the updated reliability value; and
   update a usage monitor and reliability factor (UMRF) of the one of the aircraft and the aircraft component based in the determined lifetime; and
   retire the one of the aircraft and the aircraft component after the UMRF indicates a retirement time.

10. The apparatus of claim 9, wherein the instructions, when executed by the at least one processor, cause the apparatus to:
    determine a lifetime for the aircraft based on a mapping between the updated reliability value and a range of candidate lifetime values.

11. The apparatus of claim 9, wherein the instructions, when executed by the at least one processor, cause the apparatus to:
    generate the updated reliability value by applying at least one of: (i) a monte carlo technique to the baseline reliability value inputs and the usage data, and (ii) at least one advanced reliability method to the baseline reliability value inputs and the usage data.

12. The apparatus of claim 9, wherein the instructions, when executed by the at least one processor, cause the apparatus to:
    monitor the usage data over time to capture variation in the usage data, and
    adjust the lifetime to account for the variation in the usage data.

13. The apparatus of claim 12, wherein the instructions, when executed by the at least one processor, cause the apparatus to:
    monitor the usage data at one or more predetermined time intervals.

14. The apparatus of claim 12, wherein the instructions, when executed by the at least one processor, cause the apparatus to:
    determine when to perform the monitoring based on a statistical analysis.

15. The apparatus of claim 9, wherein the usage data pertains to at least one regime of use, and wherein the instructions, when executed by the at least one processor, cause the apparatus to:

generate the updated reliability value by re-evaluating a portion of a usage input associated with the baseline reliability value that pertains to the at least one regime of use.

16. The apparatus of claim 15, wherein the at least one regime of use pertains to at least one type of maneuver performed by the aircraft.

17. The apparatus of claim 16, wherein the at least one type of maneuver comprises at least one of: take-off, climb, turn, and land.

18. The apparatus of claim 9, wherein the instructions, when executed by the at least one processor, cause the apparatus to:
   subject the usage data to the UMRF when generating the updated reliability value.

19. The apparatus of claim 18, wherein the instructions, when executed by the at least one processor, cause the apparatus to:
   iterate use of the UMRF until the updated reliability value equals the baseline reliability value or an identified reliability value.

20. The apparatus of claim 9, wherein the distribution is based on a random summation of a number of instances of the regime of use.

21. The apparatus of claim 9, wherein at least one of the baseline reliability value and the updated reliability value is based on a correlation between input variables.

22. The apparatus of claim 9, wherein the instructions, when executed by the at least one processor, cause the apparatus to:
   determine an error associated with the usage data, and
   generate the updated reliability value based on the error.

23. The apparatus of claim 9, wherein the instructions, when executed by the at least one processor, cause the apparatus to: transmit the updated reliability value from a health and usage monitor system (HUMS) module provided at the apparatus to a fleet management operations center (FMOC) to determine the lifetime and update the UMRF.

* * * * *